May 16, 1950

M. R. EUVERARD 2,507,592

WET FILM GAUGE

Filed Jan. 16, 1948

Inventor

MAYNARD R. EUVERARD

By

F. W. Wyman

Patented May 16, 1950

2,507,592

UNITED STATES PATENT OFFICE 2,507,592

WET FILM GAUGE

Maynard R. Euverard, Cincinnati, Ohio, assignor to Interchemical Corporation, New York, N. Y., a corporation of Ohio Application January 16, 1948, Serial No. 2,769

4 Claims. (Cl. 33—125)

The present invention relates to an apparatus for determining the thickness of wet films of paints, lacquers, varnishes, plastic coatings and the like.

Heretofore, instruments that have been used for measuring film thickness have been rather complex and expensive or else their use requires a skilled operator to obtain satisfactory accuracy. The most accurate of the prior art film thickness gages are designed for measuring the thickness of a dry or hard film, e. g. micrometers, electronic and magnetic devices. The N. J. Z. Needle micrometer or similar devices and the Pfund film gage are used most extensively in measuring wet film thicknesses. The accuracy of the Needle micrometer is largely dependent upon the skill of the operator using the instrument, while the Pfund gage does not provide desired accuracy over the range of interest or direct readings of film thickness. Dependent upon the properties of each film coating, especially surface tension, the reading obtained with the Pfund gage may be as great as 100% in error of the true film thickness.

The apparatus of the present invention was designed to overcome many of the difficulties encountered with the prior art gages. Instruments of the type to be described in the present invention can be used for accurately measuring the thicknesses of coatings in the fluid or semi-fluid state over any range of thickness. Furthermore its use does not require a highly skilled operator.

Broadly, the instrument of the present invention comprises a composite body having at least a portion of its circumference convexly curved, e. g. a circular disc, with a groove of gradually increasing depth around at least a portion of its circumference, the maximum and minimum depths of said groove being at least as deep and shallow respectively, as the thickness of any film to be measured. Preferably the maximum and minimum depths of the groove should be slightly greater and lesser respectively than the thickness of any film to be measured.

The non-grooved portions of the curved circumference preferably should be thin enough so that as the disc is rolled over a wet film surface these non-grooved portions, or ridges, around the circumference will penetrate the wet film. For instance using a gage constructed of stainless steel with a diameter of 2 inches for measuring film thickness of the order of 1 to 4 mils, the non-grooved portions, or film penetrating circumferences, may be about $\frac{1}{16}$ inch in thickness. The instrument is graduated in appropriate units around its curved margin to show the depths of said groove. The details of the invention will be better understood by referring to the drawings in which:

Figure 1:
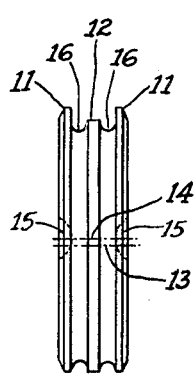
Fig. 1 is an elevation of one embodiment of the invention.
Figure 2:
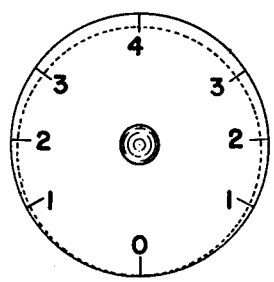
Fig. 2 is a side view of the embodiment in Fig. 1.

Figs. 1 and 2, showing how a circular disc is adapted to the present invention, represent a preferred embodiment of the invention. The radius of the disc embodiment should preferably be from about one to one and one-half inches and its thickness from one-fourth to three-fourths inch. Larger dimensions may be employed for instruments of the type which are designed to measure greater film thicknesses than are normally encountered in paint, varnish and lacquer coatings. In Fig. 1, the numeral 11 represents the non-grooved portions, or outer disc sections. These disc sections, or film penetrating circumferences, should be of such width that they will readily penetrate a wet film when the disc is rolled over a wet film surface. Generally, a width not greater than $\frac{1}{16}$ inch has been found to be satisfactory. An inner disc section 12 is of lesser radius than sections 11, whose central axis 13 is perpendicularly offset from the line 14 connecting the centers of outer discs 11 and disc 12. This disc section 12 constitutes the measuring circumference of the instrument. By this construction the depth of the circumference of disc 12 below the circumferences of outer disc 11 will be a minimum, namely, zero, at the point where a straight line, which perpendicularly bisects line 14 and runs through the center of disc 12, strikes the outer circumference of disc 12. At a point on the other side of said disc 12, which point is exactly opposite from the minimum point, the depth of the circumference of disc 12 below the circumferences of disc section 11 will be a maximum. Disc section 12, the measuring circumference, is preferably separated from the outer disc sections, or film penetrating circumferences, by valleys or grooves 16, which may be of any convenient depth around the disc. The function of these valleys or grooves will best be understood from a description of the method of using the instrument which will be found hereinbelow. Indentations at 15 serve as convenient thumb and finger holds for rolling the gage over the film.

The range of film depths for which the gage is to be used will in general dictate the optimum or preferred variations in construction of the instrument. For instance, if film depths ranging from about 0 to 4 mils are to be measured then the difference between the radii of disc sections 11 and disc section 12 should be 2 mils. Thus, when disc section 12 is offset from the center of the main disc body as described hereinabove, the range of depth of the circumference of disc 12 below the circumference of ridges 11 will be from 0 to 4 mils.

The preferred method of using the instrument illustrated in Figs. 1 and 2, is to place the circumference of the disc on the wet film surface at the point where the depth of the circumference of section 12 below the circumference of section 11 is at a maximum and then roll the disc toward the minimum, or zero, depth point. The point at which section 12 begins to contact the wet film is noted after the instrument is removed. This point, corresponding to some particular depth in convenient units, can be read from the scale on the margin of one of the outer disc sections as noted in Fig. 2. If desired, the film thickness readings can be checked by repeating the above operation and rotating the disc in the opposite direction from the first determination. If a determination is made on each half of the disc, the average of the two readings may be taken as the true film thickness.

The grooves 16, noted hereinabove, allow space for the film displaced by sections 11 to accumulate without affecting the level of the film directly under circumference section 12. As an illustration of the accuracy that can be expected by using the novel instrument it should be noted that where the range of depths of films that can be determined is 4 mils and the radius of the disc is 1 inch, then the length of the scale (one-half of a circle of 1 inch radius) is 3.1416 inches, or 3,141.6 mils. Thus there is in effect an overall magnification of about 785. Actually, however, in this particular embodiment of the invention, this will not be the case. In determining the depths of circumference 12 below circumferences 11, it is noted that around the disc these depths vary as a cosine function. Thus at 60° from the zero point the depth will be 1 mil, at 90° it will be 2 mils, at 120° it will be 3 mils, etc. From these figures it is seen that the maximum degree of accuracy in reading film thicknesses would be in the range of 0-1 mil and 3-4 mils, however, the scale from 1 mil to 3 mils depth covers a distance of more than one inch, or slightly more than 500 times the range of film depths that are measurable over this range.

From the above description of the embodiment disclosed in Figs. 1 and 2 it will be obvious that the broad scope of the present invention extends to any instrument involving the general principle on which the invention is based. For instance, any shape of inside or outside disc or plate-like sections can be employed to provide linear scales or to provide desired non-linear scales, giving maximum measurement accuracy in the particular ranges of film depths that are desired to be measured. The instrument described above and illustrated in Figs. 1 and 2, has a non-linear scale, namely, a cosine scale, and allows for a very simple construction, whose accuracy is largely dependent upon the skill of the machinist who makes the instrument.

Figure 3:
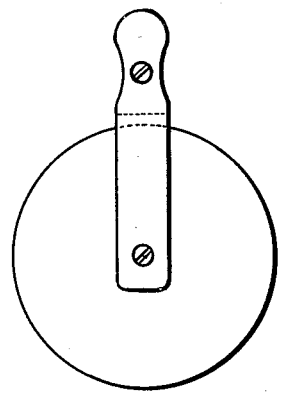
Fig. 3 is a diagrammatic sketch of another embodiment of the invention.

To better understand the broad scope of the invention attention is directed to the other embodiments of the invention illustrated in Figs. 3-7 of the drawing. Fig. 3 illustrates the manner in which a handle may be attached to a circular disc such as that illustrated in Figs. 1 and 2. This handle may be used to roll the disc over the surface of the film. It is obvious that such a handle attachment may be used with any of the other embodiments of the invention.

Figure 4:
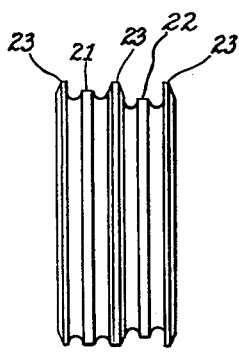
Fig. 4 is an elevation of another embodiment of the invention.

Fig. 4 illustrates a circular disc similar to that of Figs. 1 and 2 except that the disc contains two different measuring circumferences. For instance, the circumferences of disc sections 21 and 22 may have different ranges of depth below the film penetrating circumferences, disc section 23, as, for example, 0 to 4 mils, and 3 to 7 mils respectively. Thus, an instrument for measuring film depths of 0 to 7 mils is obtainable with greater accuracy than would be obtainable if all of the measuring areas were on one circular section. It is obvious that a plurality of scales could be combined into one instrument. Also it is obvious that in instruments of this design, having two measuring circumferences, only the two outer film penetrating circumferences are essential.

Figure 5:
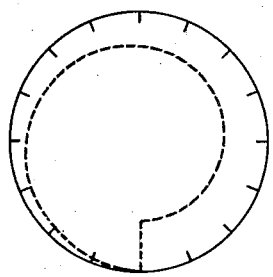
Figs. 5 and 6 are diagrammatic sketches of two other embodiments of the invention and, Fig. 7 is an elevation of still another embodiment of the invention.
Figure 6:
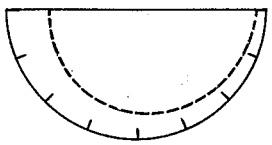

The diagrammatic sketch shown in Fig. 5 illustrates the arrangements of disk sections where the inner disk section has a spiral curvature and the outer sections are circular. The difference in dimensions of the sections are of course exaggerated to better illustrate the principles of the invention. Fig. 6 illustrates diagrammatically an embodiment in which only a portion of the circumferences of the plate-like sections is curved. In this instance, as in all the other embodiments, it is obvious that the curved circumference of the disk sections may take any convexly curved form as circular, elliptical, cycloidal, etc. As illustrated in Fig. 6, the minimum depth of the smaller curved circumference below the circumference of the larger curved circumference need not be zero. This is also illustrated in one of the measuring circumferences in Fig. 4. As has already been stated, the only limiting depths with respect to these maximum and minimum depths are that they must be at least as deep and as shallow respectively, as the thickness of any film to be measured.

Figure 7:
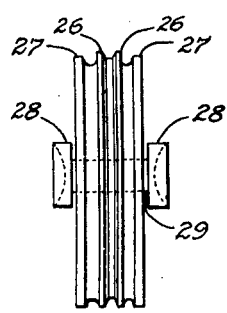

Still another embodiment of the invention is shown in Fig. 7 which comprises a disc grooved in such manner as to provide film penetrating circumference ridges at 26, and measuring circumferences at 27. As in all the other embodiments of the invention depth of the measuring circumference below the film penetrating circumference varies, over at least a substantial portion of the circumference, from a minimum depth of at least as shallow as the minimum thickness of any film to be measured to a maximum depth of at least as deep as the thickness of any film to be measured. Thumb and finger holds 28 are rigidly attached to axle 29 extending substantially through the center of the disc and cooperate with axle 29 in providing a means for rolling the gage on the film to be measured. Where measuring circumferences 27 are alike it is possible to obtain two comparative film thickness readings by rolling the gage over the film one time. Where the two measuring circumferences are different, i. e. where their ranges of depth below the film penetrating circumferences are different, then there is in effect two gages in the one instrument.

The film gage of the present invention is preferably machined from a single piece of metal that is resistant to corrosion by the ingredients of the film being measured. However, the instrument can consist of individual sections of the desired shape rigidly attached together.

Gages can be made that give a direct measurement of film thicknesses which are accurate to the nearest 0.1 mil. Furthermore, such accuracy is possible without the aid of a highly skilled operator. The manner of construction is such that the gage can be cleaned readily and requires no calibrating or adjustment from one determination to next.

Having now described my invention and stated the manner in which it may be practiced I claim as my invention:

1. A wet film thickness gage comprising a composite body made up of two equally dimensioned co-axial disk sections in axial alignment and having at least a portion of their circumferences convexly curved and constituting film penetrating edges, a third disk section providing at a corresponding convexly curved portion of its circumference a band-like measuring surface, said measuring surface having a radius equal at one point to that of the film penetrating edges of said first two disk sections, receding thereafter until reaching another point the depth of which below the said film penetrating edges is at least equal to the thickness of any film to be measured, intermediate disk sections of lesser dimensions between the said first three disk sections, and a scale at the margin of at least one of the said first two disk sections showing in appropriate units the depth of the measuring surface below the said film penetrating edges.

2. A wet film thickness gage comprising a composite metal body made up of two coaxial outer circular disk sections having equal radii, an inner circular disc section of lesser radius between the said outer sections, coaxial with said outer sections intermediate disk sections of lesser radii than the inner section separating said outer sections from said inner section, wherein the axis of the inner circular section is perpendicularly offset from the axis connecting the center of the outer and intermediate sections by a distance equal to the difference between the radii of the said outer sections and the inner section, and the margin of at least one of the outer sections being graduated in appropriate units showing the depth of the circumference of the inner section below the circumference of the outer sections.

3. A wet film thickness gage comprising a composite body made up of two equally dimensioned coaxial disk sections in axial alignment having at least a portion of their circumferences convexly curved and constituting film penetrating edges, a third disk section in axial alignment with the said first two disk sections providing at a corresponding convexly curved portion of its circumference a band-like measuring surface, said measuring surface having at one point a depth below the said film penetrating edges which is less than the thickness of any film to be measured, receding thereafter until reaching another point the depth of which below the said film penetrating edges exceeds the thickness of any film to be measured, intermediate disk sections of lesser dimensions between the said first three disk sections, and a scale at the margin of at least one of the said first two disk sections showing in appropriate units the depth of the measuring surface below the said film penetrating edges.

4. A wet film thickness gage comprising a composite body made up of two coaxial outer circular disk sections having equal radii, an inner circular disk section of lesser radius between the said outer sections, coaxial with said outer sections, intermediate disk sections of lesser radii than the inner section separating said outer sections from said inner section, wherein the axis of the inner circular section is perpendicularly offset from the axis connecting the center of the outer and intermediate sections by a distance shorter than the difference between the radii of the said outer sections and the inner section, and the margin of at least one of the outer sections being graduated in appropriate units showing the depth of the circumference of the inner section below the circumference of the outer sections.

MAYNARD R. EUVERARD.

REFERENCES CITED

The following references are of record in the file of this patent:

UNITED STATES PATENTS

| Number | Name | Date |
|---|---|---|
| 275,734 | Von Reitzner | Apr. 10, 1883 |
| 513,596 | Poole | Jan. 30, 1894 |
| 861,582 | Fildes | July 30, 1907 |
| 1,514,250 | Briney | Nov. 4, 1924 |
| 1,909,652 | Bower | May 16, 1933 |
| 1,927,821 | Abbott | Sept. 26, 1933 |
| 2,243,674 | Hoch | May 27, 1941 |